United States Patent
Pitzen

[19]

[11] Patent Number: 5,832,879
[45] Date of Patent: Nov. 10, 1998

[54] APPARATUS TO REDUCE BLOOD ALKALINITY IN PREFRESHENED COWS

[75] Inventor: Daniel Pitzen, Clinton, Iowa

[73] Assignee: NuTeam, Inc., Millersburg, Ohio

[21] Appl. No.: 520,882

[22] Filed: Aug. 30, 1995

[51] Int. Cl.$^6$ ................................................. A01K 29/00
[52] U.S. Cl. ............................................ 119/858; 600/15
[58] Field of Search .................................. 119/858, 863, 119/865; 54/79.1, 66; 600/15

[56] References Cited

U.S. PATENT DOCUMENTS

| | | | |
|---|---|---|---|
| 2,212,160 | 5/1940 | Kelly | 119/856 |
| 2,924,198 | 2/1960 | McMurray | 119/856 |
| 3,086,268 | 4/1963 | Chaffin, Jr. | 119/863 X |
| 3,589,341 | 6/1971 | Krebs | 119/865 |
| 4,095,587 | 6/1978 | Ishikawa | 600/15 |
| 4,162,672 | 7/1979 | Yazaki | 600/15 |
| 4,587,956 | 5/1986 | Griffin et al. | 600/15 |
| 4,895,110 | 1/1990 | LaCascio | 119/859 |
| 5,314,400 | 5/1994 | Tsyb et al. | 600/9 |
| 5,389,061 | 2/1995 | Nor | 600/15 |
| 5,426,925 | 6/1995 | Smargiassi | 54/66 X |
| 5,450,858 | 9/1995 | Zablotsky et al. | 600/15 |

FOREIGN PATENT DOCUMENTS

| | | |
|---|---|---|
| 2546758 | 5/1984 | France . |
| 2703214 | 3/1993 | France . |

OTHER PUBLICATIONS

Northco Co., "Northco Serv–O–Matic Dairy Feeder", product brochure.
Goff, Jesse P. and Horst, Ronald L., "Anionic Salts Help Prevent Milk Fever", *Hoard's Dairyman*, Dec. 1992.
Pitzen, "The Maddy Opportunity Partner News", Maddy Nutrition Corporation, Clinton, Iowa, Nov. 1994.
Roffey, "A Theoretical Approach to Somatoemotional Magnetic Therapy", Townsend Letter for Doctors, Apr. 1993.

*Primary Examiner*—Robert P. Swiatek
*Assistant Examiner*—Elizabeth Shaw
*Attorney, Agent, or Firm*—Allan L. Harms

[57] ABSTRACT

Apparatus to reduce alkalinity in the blood stream of a prefreshened cow. A flexible magnetic flux transparent housing one or more magnets is provided to be fastened about the neck of the cow to position the magnets adjacent the sides of the neck of the cow. The magnets may be flexible strip magnets or a series of ceramic or other permanent magnets.

19 Claims, 2 Drawing Sheets

APPARATUS TO REDUCE BLOOD ALKALINITY IN PREFRESHENED COWS

BACKGROUND OF THE INVENTION

In the dairy industry, it is well known that a low blood calcium level in a cow following calving is associated with the disease hypocalcemic periparturient paresis, commonly known as milk fever. Cows that suffer from milk fever, or those not showing milk fever symptoms but having subclinically low blood calcium, have more problems with retained placenta, poor appetites displaced abomasum, ketosis, and early uterus infections. Calcium is needed to maintain good muscle tone of the gut and uterus.

The common method for preventing milk fevers has been to restrict calcium intake before freshening. This method isn't always effective. Calcium restriction is believed to stimulate the body mechanism that mobilizes calcium from bones into the blood stream. High calcium levels in most hay crops today makes calcium restriction difficult. Strides have been made through modification of the cation and anion mineral balance through feeding mineral supplements and selected feeds prior to freshening, to shift the metabolism of the cow to a more acidic state. This acidic state can be measured by a lowering of urine pH. Most cows fed legumes and grasses are consuming many more cations (potassium, sodium, calcium, and magnesium) than anions (chloride, sulfur, and phosphorus). A high intake of cations relative to anions causes the cow's blood and urine to become more alkaline (higher pH). That condition reduces bone calcium release and intestinal calcium absorption and results in low blood calcium levels when the cow starts milking. It has been suggested that success in the use of lower calcium rations prior to freshening to reduce milk fever susceptibility may occur because low calcium feeds are also very often low in total cations, including potassium.

SUMMARY OF THE INVENTION

This invention relates to prevention of milk fever in freshened cows by correcting low blood calcium levels. The present invention provides a collar which will surround the neck of a cow, the collar having therein at least one magnet.

The process of calving and commencement of colostrum and milk production causes a demand on the calcium stores of a cow, causing a drop in blood calcium concentration which is associated with milk fever. The normally healthy cow must draw calcium from bone and become efficient at absorption of calcium in its gastrointestinal system. A cow with increased alkalinity in the blood suffers from a condition in which the parathyroid glands are less effective in causing a release of calcium stored in the bone and in increasing absorption of calcium in the gut. Hence, it is desirable to reduce the pH of the prefreshened cow in anticipation of calving.

It is known that low blood calcium levels in cows are associated with an alkaline condition in the cow, that is, an excess of cations in the blood stream and an increased pH. Acidity in the physiology of a cow is a function of the concentration of hydrogen ions (H+) in the blood stream of the cow. Hydrogen ions arise from the decomposition of water molecules from dietary intakes, and from other physiologic mechanisms. When allowed to reach an ambient state, hydrogen anions combine to form hydrogen molecules, $H_2$. When hydrogen atoms are subjected to a magnetic field, their spins are polarized and the atoms will be less likely to combine to form hydrogen molecules. In the anion state, H+ ions contribute to a lowering of pH, that is, to a more acidic state.

In order to subject the H+ ions in a cow's body to a magnetic field, a magnetic collar was developed. The preferred embodiment of the invention provides a cow collar with a pair of flexible strip magnets carried within a sheath comprising the collar such that one strip magnet is adjacent one side of the cow's neck and another strip magnet is adjacent the opposite side of the cow's neck.

It is an object of the invention to provide an apparatus to reduce the alkalinity of the body of a cow.

It is a further object of the invention to provide a simple, easy to use collar useful to increase the calcium levels in a freshened cow.

It is a further object of the invention to provide a collar which can be simply mounted about the neck of a prefreshened cow to effectuate a decrease in the pH level of the cow.

It is a further object of the invention to provide a safe, easy to use apparatus to reduce the incidence of milk fever in freshened cows.

These and other useful objects will be understood from the detailed description which follows.

DESCRIPTION OF THE DRAWING FIGURES

DETAILED DESCRIPTION OF THE INVENTION

It has been postulated that acidity in blood is determined by the relative concentration of positively charged and negatively charged ions present in the blood. Positively charged ions (anions) and negatively charged ions (cations) in part enter the blood stream from the dietary intake of the cow. The relative numbers of cations and anions in the blood stream determine its acidity. By increasing the concentration of anions in the blood, the pH level thereof is decreased. The present invention provides apparatus which increases the concentration of anions in the blood stream of the cow on which the apparatus is placed.

Figure 1:
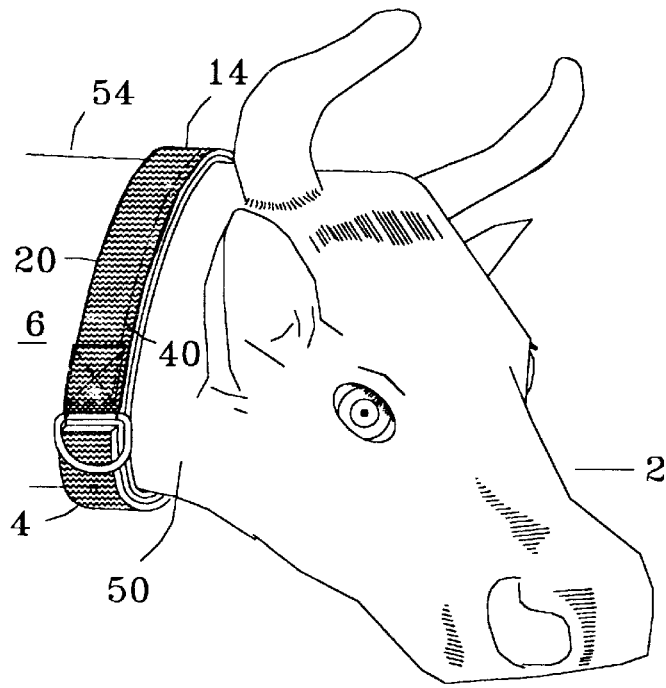
FIG. 1 is a perspective view of a cow equipped with the preferred embodiment of the invention.

Referring now to the drawings, FIG. 1 discloses a cow 2 on the neck 6 of which the invention 4 has been placed. The invention 4 surrounds the neck 6 of the cow 2 such that invention 4 may be fastened by buckle 8 in the typical manner. It can be seen that the invention 4 is provided with two relatively more stiff segments 10 and 12 interconnected by an intermediate relatively less stiff region 14, the less stiff intermediate region 14 being advantageous to maintaining the position of the invention 4 on neck 3 of cow 2.

Figure 3:
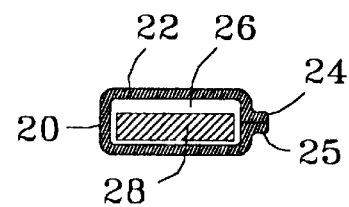
FIG. 3 is a cross section taken along line 3—3 of FIG. 2 showing the placement of the magnet element within a mart of the sheath of the collar invention.
Figure 2:
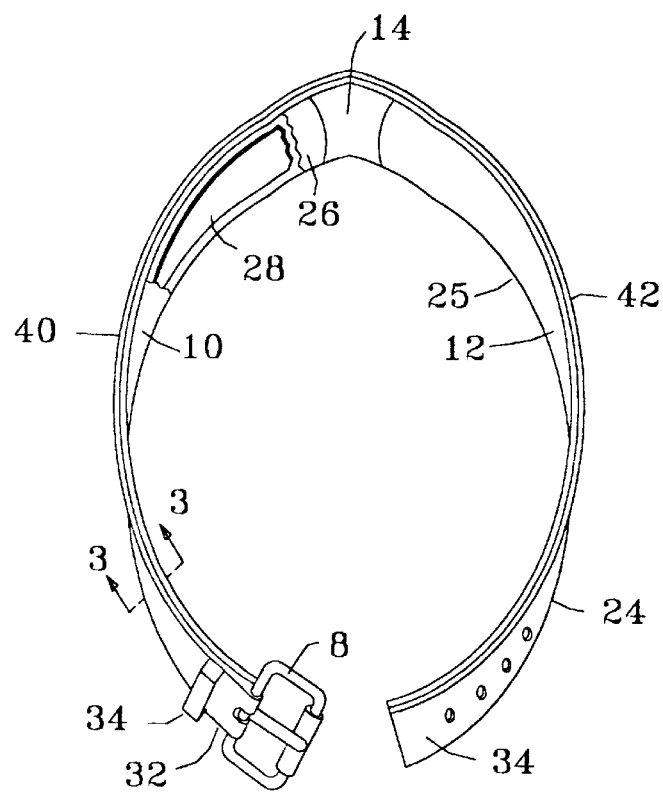
FIG. 2 is a perspective view of the invention with a part of the collar cut away to reveal the magnetic element.

Referring to FIGS. 2 and 3, it can be visualized that invention 2 comprises a collar 20 of a fabric or leather construction which is transparent to magnetic flux. Collar 20 is provided with a plurality of magnetic elements 28, which, in the preferred embodiment, are enclosed in a sheath 22 within collar 20 provided by the use of a folded over length of fabric sewn together along the edges 24 and 25 thereof, making a pocket 26 into which magnetic elements 28 may be inserted. Pocket 26 formed by the folded over length of fabric extends along substantially the entire length of collar 20 between opposing ends 32 and 34 thereof.

Collar 20 is provided with a buckle 30 on its first end 32 such that second end 34 of collar 20 may be secured by buckle 8 in the usual belt fashion. A ring 34 is conveniently placed along collar 20 near first end 32.

In the preferred embodiment, collar 20 is constructed of nylon fabric and is provided with a flexible strip magnet 28 inside the pocket 26 of each of first half 40 and second 42 of collar 20, it being intended that first half 40 will naturally position itself adjacent first side 50 of the cow's neck 3 and second half 42 will position itself adjacent the opposite side 52 of cow's neck 3. Intermediate region 14 separates first half 40 and second half 42 and flexes to adapt to the shape of ridge 54 of cow's neck 3. The placement of strip magnets 28 within the respective pockets 26 of first half 40 and second half 42 of collar 20 serves to space the magnets 28 apart and renders the first and second halves 40 and 42 relative more stiff than intermediate region 14.

Figure 4:
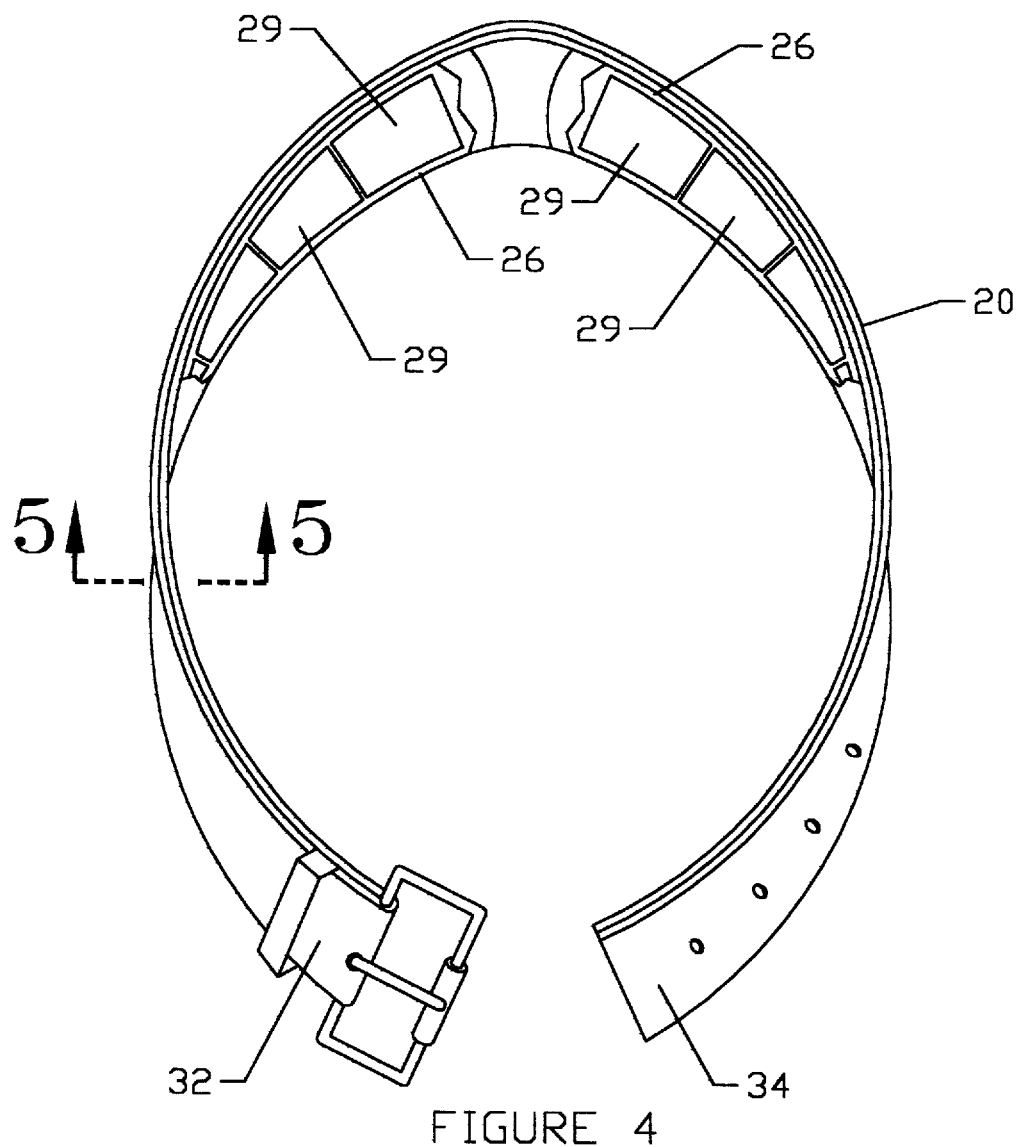
FIG. 4 is a perspective view of an alternative embodiment having a series of end to end magnets positioned in the sheath of the collar.
Figure 5:
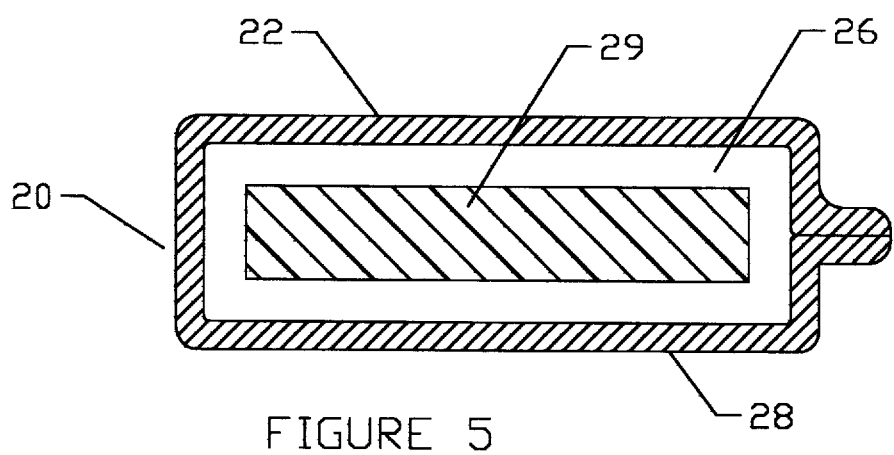
FIG. 5 is a cross section taken along line 5—5 of FIG. 4 showing the placement of ceramic magnets within the sheath of the alternate embodiment collar invention.

Magnets 28 may be substituted by other shapes of permanent magnets and other pluralities of magnets. It is equally useful to utilize a series of discrete ceramic magnets within pockets 26 with the magnets 29 of the series of magnets positioned end to end in an edgewise arrangement as shown in FIG. 4. However, it is found that the most advantageous disposition of magnets 28 is with the magnetic axis thereof perpendicular to the neck 3 of the cow 2. When strip magnets 28 are employed, best results are observed with the "north" poles of magnets 28 disposed adjacent cow's neck 3. Polarity was determined using guidelines outlined by National Bureau of Standards. Strip magnets 28 having flux strength in the range of 1,800 to 2,600 gauss are found to effectuate the desired result. If a series of discrete magnetic elements such as ceramic magnets is employed to replace a strip magnet 28, the combined flux strength of the series is preferably in the 1,800 to 2,600 gauss range, for each of first half 40 and second half 42 of collar 20.

OPERATION OF THE INVENTION

The dairy herd operator will identify those prefreshened cows which show susceptibility to milk fever and will place an invention 4 about the neck of identified cows during the last two to three weeks prior to anticipated calving and will remove the invention 2 on the day of calving.

EXAMPLE

In a recent trial, a local herd owner collected urine samples from five cows which were then fitted with the invention. Collection of urine from the subject group as well as from a control group was made five days later. The pH of the urine from the cows fitted with the magnetic collar invention was consistently lower than before the invention was applied and also lower than the cows in the control group.

Having described the invention, I claim:

1. Apparatus to prevent milk fever in cows, comprising:

a collar sized to surround the neck of a cow, said collar having a sleeve therewithin, said sleeve of said collar having a plurality of magnets mounted therewithin, said collar retaining at least one of said magnets for placement adjacent a first side of the neck of the cow, said collar retaining another of said magnets for placement adjacent to the opposing side of the neck of said cow, each of said magnets having a north pole, each of said magnets oriented with the north pole thereof facing said neck of said cow, said magnets are a pair of strip magnets, each of said magnets is of combined magnetic strength in the range of 1800 to 2600 gauss.

2. Apparatus to lower the pH of the blood of a cow comprising a collar sized to surround the neck of a cow, said collar having a plurality of magnetic elements mounted along the length thereof, each of said magnetic elements having a magnetic pole, at least one of said magnetic elements having a magnetic pole thereof a first direction for placement facing a first side of the neck of said cow, at least a second of said magnetic elements having a magnetic pole thereof facing an opposing direction for placement side of the neck of said cow, said plurality of magnetic elements comprises a series of ceramic magnets arranged end to end, said plurality of magnets mounted to said collar in two spaced apart sets, one set of said magnets positioned for placement adjacent a first side of the neck of the cow, the other set of said magnets positioned for placement adjacent a second side of the neck of said cow, each set of said magnets having magnetic strength of between 1800 and 2600 gauss, said collar having a sleeve along substantially the entire length thereof, said collar being of magnetic flux transparent material, said magnets received within said sleeve, said sets of magnets spaced apart within said sleeve.

3. Apparatus to lower the pH of the blood of a cow comprising a collar sized to surround the neck of a cow, said collar having a plurality of magnetic elements mounted along the length thereof, each of said magnetic elements having a magnetic pole, at least one of said magnetic elements having a magnetic pole thereof a first direction for placement facing a first side of the neck of said cow, at least a second of said magnetic elements having a magnetic pole thereof facing an opposing direction for placement facing second side of the neck of said cow, said plurality of magnetic elements is a pair of elongate flexible strip magnets, each of said strip magnets having a polarized face along the length thereof, said polarized face of each of said strip magnets for placement facing the neck of said cow, said collar having a sleeve along substantially the entire length thereof, said collar being of magnetic flux transparent material, said magnets received within said sleeve, said magnets spaced apart within said sleeve, the first of said pair of strip magnets retained for placement adjacent a first side of the neck of said cow, the second of said pair of strip magnets retained for placement adjacent the opposing side of the neck of said cow.

4. The apparatus of claim 3 wherein said collar having a region coincident with said space between said magnets, said region of said collar retainable upon the top of the neck of said cow.

5. The apparatus of claim 4 wherein each of said strip magnets is of magnetic strength of 1800 to 2600 gauss.

6. The apparatus of claim 5 wherein each of said strip magnets has a north pole on an elongate face thereof, said north pole of each of said magnets retained in position facing the side of the neck of said cow.

7. A therapeutic collar for cows comprising an elongate strap sized to surround the neck of a cow, the strap having a longitudinal axis, said strap having at least one elongate in-line magnetic element fixed thereto, said at least one magnetic element having a longitudinal axis parallel to the longitudinal axis of said strap, said at least one magnetic element extending along substantially the entire length of said strap, said strap retaining said at least one magnetic element for placement adjacent the neck of the cow.

8. The collar of claim 7 wherein said at least one magnetic element is a series of magnets positioned end to end, each of said magnets having a north pole, each of said magnets oriented with the north pole thereof for placement facing said neck of said cow.

9. The collar of claim 8 wherein said plurality of magnets is arranged in two sets with one set disposed for placement adjacent one side of the neck of the cow and the other set disposed for placement adjacent the opposing side of the neck of the cow.

10. The collar of claim 9 wherein said magnets of each set are of combined magnetic strength in the range of 1800 to 2600 gauss.

11. The collar of claim 7 wherein said at least one magnetic element is a pair of elongate flexible strip magnets.

12. The collar of claim 11 wherein each of said magnets has a north pole, each of said magnets oriented with the north pole thereof for placement facing said neck of said cow.

13. A therapeutic collar for cows comprising an elongate strap sized to surround the neck of the cow, the strap having a magnetic element fixed thereto, said at least one magnetic element extending in-line along substantially the entire length of said strap, said strap retaining for placement said magnetic element adjacent the neck of the cow, said strap having a sleeve along substantially the entire length thereof, said magnetic element is received in said sleeve.

14. The collar of claim 13 wherein said at least one magnetic element is a plurality of magnets.

15. The collar of claim 14 wherein said strap retains at least one of said magnets for placement adjacent a first side of the neck of the cow, said strap retains another of said magnets for placement adjacent the opposing side of the neck of said cow.

16. The collar of claim 14 wherein said magnets are a pair of strip magnets.

17. The apparatus of claim 16 wherein each of said magnets has a north pole, each of said magnets oriented with the north pole thereof for placement facing said neck of said cow.

18. The collar of claim 14 wherein said magnets are ceramic magnets.

19. The collar of claim 13 wherein said at least one magnetic element is a plurality of magnets positioned end to end in said sleeve.

* * * * *